United States Patent [19]
Leong

[11] Patent Number: 5,993,717
[45] Date of Patent: Nov. 30, 1999

[54] METHOD OF PRODUCING A LATEX PRODUCT

[75] Inventor: See Teik Leong, Perak, Malaysia

[73] Assignee: Maxhill Toy Industries SDN. BHD., Perak, Malaysia

[21] Appl. No.: 08/789,713

[22] Filed: Jan. 27, 1997

[51] Int. Cl.⁶ .................. C08J 5/00; C08J 9/00; C08K 9/06
[52] U.S. Cl. .................. 264/233; 264/331.13; 524/575.5
[58] Field of Search .............. 264/331.13, 201, 264/233; 524/575.5

[56] References Cited

U.S. PATENT DOCUMENTS

| | | |
|---|---|---|
| 2,610,851 | 9/1952 | Jones ................................ 272/8 |
| 2,653,918 | 9/1953 | Eckert . |
| 3,104,648 | 9/1963 | Fisher ................................ 119/29 |
| 3,969,289 | 7/1976 | Coffin et al. . |
| 4,214,053 | 7/1980 | Porter . |
| 4,877,566 | 10/1989 | Cha ................................ 264/118 |
| 4,957,798 | 9/1990 | Bogdany ................................ 428/95 |

FOREIGN PATENT DOCUMENTS

| | | |
|---|---|---|
| 570893 | 2/1933 | Germany . |
| 332525 | 8/1930 | United Kingdom . |
| 8100361 | 2/1981 | WIPO . |

*Primary Examiner*—Jan H. Silbaugh
*Assistant Examiner*—Suzanne E. Mason
*Attorney, Agent, or Firm*—Wechsler & Wechsler, P.C.; Lawrence I. Wechsler

[57] ABSTRACT

There is disclosed a method of producing a molded latex product which does not require a vulcanizing step.

15 Claims, No Drawings

METHOD OF PRODUCING A LATEX PRODUCT

BACKGROUND OF THE INVENTION

1. Field of the Invention

The present invention relates to a method of producing a molded latex product which does not require a vulcanizing step.

2. Description of Prior Developments

Latex or emulsion-polymerization technology is well-known in the art and includes vinyl acetate, vinyl chloride, acrylics, acrylonitrile and ethylene, in addition to the monomers of styrene, butadiene and isoprene. Emulsion polymerization is a heterogeneous noncatalytic reaction. The mechanistic reaction model is based on the mixing of a monomer and a surfactant in water to yield both monomer droplets and solubilized monomer in micelles. The free radical is generated in the aqueous phase and can enter either the monomer droplet or monomer-swollen micelle.

Generally, the course of batch-emulsion polymerization is subdivided into three intervals. Particle formation takes place during interval I and, depending on the water solubility of the monomer, normally ends at 1–5% conversion. Interval II is characterized by the growth of the primary particles and ends when the separate monomer phase disappears. In interval III, the particle volume decreases, i.e. the monomer concentration in the particle decreases with a corresponding increase in polymer viscosity.

Solubilization is the spontaneous passage of molecules of an insoluble substance in water into the interior of the micelle of a dilute surfactant solution. Solubilization involves the process of diffusion from a separate monomer phase to the micelle. Emulsification occurs beyond the monomer saturation point of micelles with further addition of monomer. There is a strong temperature effect on the solubilization of an oil in the aqueous solution of a nonionic surfactant that results from a change in the hydrophilic-lipophilic balance (HLB) of the surfactant.

Emulsion polymers generally are considered to be metastable systems. The large surface represented by the particles is thermodynamically unstable and any perturbation affecting the balancing forces results in a change of the kinetics of particle agglomeration. An interface, e.g. the latex polymer particle aqueous phase interface, may acquire an electrostatic charge by any one of several well-known mechanisms.

Freeze-thaw stability, which is important to shipping and storing of latices, may be accomplished in any one of several ways including the incorporation of ionogenic comonomers and the prevention of ice formation. This may be achieved by the addition of water-soluble solvents, such as ethylene glycol, propylene glycol, etc. which depress the freezing point. With ionogenically stabilized latices, the addition of a water-soluble organic solvent swells the latex particles but does not dissolve them The latex particles are stabilized by charge and hydration of polar surface groups. The degree of charge stabilization is determined by the balance between the surface-active agent concentration on the particle surface and particle size. The stability and the performance properties of latices depend in part on the particle size and distribution. Viscosity is dependent upon latex rheology.

The traditional raw material has been natural latex concentrate preserved with approximately 0.7% ammonia and containing about 60% of rubber. This is normally prepared on rubber estates by centrifugation of field latex. Creamed latex concentrate may also be used. Concentrates are available containing a lower amount (0.2%) of ammonia together with a secondary preservative. Blends of natural rubber latex with styrene-butadiene (SBR) latices are frequently employed. The choice of blend depends on factors such as price, processing behavior and technical requirements for the final product.

There are several well-known methods of producing latex products. Dipped articles, which are seamless hollow articles, in general are formed from polymer solutions or dispersions by completely coating a mold surface, then drying and cross-linking the coating. The molds are coated by dipping them briefly into the polymer solution or dispersion so that polymer precipitates on their surface. Latex products precipitated on molds are dried in hot air and vulcanized. Articles produced in hollow molds by casting may be considered a special category of dipped articles. In such cases, the precipitation of the polymer takes place mainly by absorption of the serum through the pores. Very high wall thicknesses are achieved in this way.

Molded foams are also well-known in the art. The greatest proportion of molded foam is produced by the Dunlop process. Here, an aqueous sodium silicofluoride dispersion is added to the readily mixed, vulcanizable latex compound during the mechanical foaming process. The quantity depends on the desired potlife of the foam compound, which is generally adjusted to 8–12 minutes, a time sufficient to fill the foam molds. After vulcanization, the articles are removed from the mold, washed and dried.

In the so-called Kaysam process sensitization is carried out with ammonium salts in the presence of zinc oxide whereas in the Dunlop process sodium or potassium silicofluoride is used with zinc oxide.

Polyvinyl methyl ether and polyoxypropylene glycol are easily soluble in water at room temperature, but at a certain temperature they become insoluble in water and are precipitated. Simultaneously they induce the latex particles to coagulate as an irreversible coagulum, resulting in a uniform film deposited on the surface.

In the case of heat sensitization with trypsin, the stabilizing protein substances still present in the latex are decomposed and the latex is so sensitized that, after the addition of zinc oxide and simultaneous heating of the compound to about 50° C., spontaneous coagulation takes place in about 3 to 4 minutes.

The Talalay process is an alternative foam process by which the vulcanizable latex compound is frothed in a mechanical mixer to give a foam with relatively high density which is poured into molds. The closed molds are evacuated. The latex compound foams to its final density because of the vacuum applied and thus fills the mold completely. By cooling the mold to about 30° C. the structure of the foam is fixed. Carbon disxide is led into the mold, thus lowering the pH of the frozen foamed latex compound, which then gels. The foam can then be thawed and the mold heated in stages to 110° C. After vulcanization is complete, the article is removed from the mold, washed and dried.

In each of the above processes, a synthetic rubber latex is employed. Synthetic latices are differentiated from other polymer dispersions [i.e. poly(vinyl chloride), ethylene vinyl acetate copolymer or polyacrylates]. The criterion for identifying a synthetic latex is recognized to be the irreversible conversion of the polymer from the thermoplastic to the elastomeric state by vulcanization.

Latex vulcanizates are dried in air room temperature or at an elevated temperature. The drying of very thin sectioned goods (0.5–0.1 mm) is extremely rapid. The drying of thick-walled goods takes place in two phases, the first phase being rapid but the second phase taking considerably longer owing to the reduced water permeability of the film. Therefore, hot air with a relative humidity of 50% to 60% is often passed over the drying films. The humidity in the hot air prevents the surface of the rubber film from closing as rapidly as it would otherwise do and thus enables water inside the film to reach the surface more easily. At an elevated temperature, i.e. 100° C. to 110° C., the drying takes place rapidly. It is generally considered advisable to dry at a moderate temperature initially (about 70° C.) and then to pass from drying to curing by increasing the temperature to 110° C.

The method of the present invention, which may be used with any type of latex, produces a superior latex product which does not require vulcanization and, therefore, does not require the drying of latex vulcanizates. Surprisingly, the present method teaches the production of solid latex foam without requiring a vulcanization step.

SUMMARY OF THE INVENTION

The present invention is directed to a method of manufacturing a latex product which does not require vulcanization, comprising adding from about 0.5% to about 2.0% of a setting agent and from about 0.5% to about 2.0% of an anti-foaming agent to a latex compound to form a latex mixture; injecting the mixture into a mold; heating and drying the mixture in a steamer; removing a molded article from the mold; and drying and washing the article.

DETAILED DESCRIPTION OF THE INVENTION

According to one aspect of the present invention, there is disclosed a method of manufacturing a latex product which does not require vulcanization, comprising:
  a) adding from about 0.5% to about 2.0% of a setting agent; about 0.5% to about 1.0% of a water based dispersion pigment; about 0.5% to about 2.0% silicone and emulsifier to a latex to form a latex mixture;
  (b) injecting the mixture into a mold;
  (c) heating the mixture for about 10 minutes to about 30 minutes at a temperature ranging from about 70° C. to about 100° C.;
  (d) removing a molded article from the mold;
  (e) drying the article for about 48 hours to about 60 hours at a temperature ranging from about 60° C. to about 75° C.;
  (f) washing the article in an aqueous wash; and
  (g) drying the article for about 1 hour to about 3 hours at a temperature ranging from about 60° C. to about 75° C.

According to another aspect of the present invention, there is disclosed a method of manufacturing a latex product which does not require vulcanization, comprising:
  a) adding from about 0.5% to about 2.0% of a setting agent; about 0.5% to about 1.0% of a water based dispersion pigment; about 0.5% to about 2.0% silicone and emulsifier to a latex to form a latex mixture;
  b) injecting the mixture into a mold;
  c) cooling the mixture for about 10 minutes to about 45 minutes at a temperature ranging from about 15° C. to about 22° C.;
  d) removing a molded article from the mold; and
  e) drying the article for about 48 hours to about 60 hours at a temperature ranging from about 15° C. to about 22° C.

According to still another aspect of the present invention there is disclosed a method of manufacturing a latex product which does not require vulcanization, comprising:
  a) adding from about 0.5% to about 2.0% of a setting agent; about 0.5% to about 1.0% of a water based dispersion pigment; about 0.5% to about 2.0% silicone and emulsifier to a latex to form a latex mixture;
  (b) injecting the mixture into a mold;
  (c) heating the mixture for about 10 minutes to about 30 minutes at a temperature ranging from about 70° C. to about 100° C.;
  (d) removing a molded article from the mold;
  (e) drying the article for about 48 hours to about 60 hours at a temperature ranging from about 15° C. to about 22° C.;
  (f) washing the article in an aqueous wash; and
  (g) drying the article for about 1 hour to about 3 hours at a temperature ranging from about 60° C. to about 75° C.

The method of the present invention may be used for any number of applications, including the production of pet toys. The toys produced by the disclosed unique method are rigid and durable but retain enough flexibility to return to their original shape. The latex toys are safe and non-toxic, do not have a bitter taste and float. Their tough exterior finish is long lasting, even when dogs or cats scratch and bite them. Examples of such items are the GUM-GUM BAR™ dog toy and the PET DISH™ cat toy.

The latex articles produced by the present invention contain a setting agent which is preferably a mixture containing from about 0.5% to about 2% sodium silicone fluoride with the most preferable amount being about 2%. Sodium silicone fluoride enables the liquid latex mixture to take form at a high temperature, that is, a temperature ranging from about 70° C. to about 100° C. When the formed latex is heated, it shrinks and facilitates easy removal from the mold. Types of molds which may be used are numerous and include, for example, aluminum, steel, glass-fiber, epoxy, and plaster-of-paris. While sodium silicone fluoride has been used in prior art methods of latex foam manufacture as discussed above, it has not been used before for solid latex manufacture. Indeed, the present invention incorporates use of an anti-foam or defoaming silicone E58, which is silicone and emulsifier, in an amount of about 0.5% to about 2.0%. This results in a significant advance from the prior art methods.

Preferably, the latex compound comprises about 98% to about 99.5% of natural rubber latex (60%) which is also known as centrifuged latex (60%), creamed latex concentrate (60%), or by the trade name PR CREAM brand latex concentrate. This is considered to be a pure form of latex because it does not contain sulfur or zinc oxide or other agents normally used with methods requiring a vulcanization step. Indeed, the natural rubber latex (60%) cream as used in the present invention cannot be vulcanized. Consequently, the resultant product retains its gummy texture and when stretched, returns slowly to its original shape. The natural rubber latex (60%) cream also imparts a pleasant taste to the pet toys, unlike other latex toy products, making them more appealing to pets.

Other ingredients used in the present invention preferably include bentonite which acts as a catalyst for the sodium silicofluoride in an amount of about 0.1% and a pigment which is used for decorative purposes.

EXAMPLE

To a vessel are added the following ingredients:

| | Parts by Weight |
|---|---|
| 60% Natural rubber latex, LA type | 167.0 |
| 50% Sulphur dispersion | 4.0 |
| 20% Potassium oleate solution | 7.5 |
| 50% Zinc diethyldithiocarbamate dispersion | 2.0 |
| 50% Zinc 2-mercaptobenzothiazole dispersion | 2.0 |
| 50% Antioxidant dispersion | 2.0 |
| 50% Ethyl chloride-formaldehyde-ammonia reaction product solution | 1.0 |
| 50% Zinc oxide dispersion | 10.0 |
| 20% Sodium silicofluoride dispersion | 6.0 |

The mixture is injected into a steel, aluminum, epoxy or RTV silicone mold and cooked in a steamer or hot air oven at a temperature of 70° C. to 100° C. for 10 to 30 minutes. Thereafter, the article is released from the mold and hot air is passed over it (in a hot air oven) causing it to dry. The drying temperature ranges from 55° C. to 65° C. Drying time is 48 to 60 hours, depending on the size of the desired article.

According to the present method, the mixture is cooked in a steamer or hot air oven. Thus, the steamer also acts as a wetting agent and facilitates release of the mixture from the mold which is accomplished by the use of a simple tool and manual manipulation. After the mixture is released from the mold, the article is put into a hot air oven for drying. It is then washed with an aqueous solution, dried in a hot air oven, stamped with a design and packaged.

The method of the present invention may also use cool dry room air, i.e. at a temperature ranging from about 15° C. to about 22° C., to dry the mixture while it is still in the mold and then to also dry the article after it is released from the mold. Additionally, the present method may use a steamer or hot air oven for drying the article first followed by drying it in cool dry room air or, alternatively, the article may first be cooled by dry room air followed by drying in a hot air oven.

The formulation given is suitable for the production of latex foam by the silicofluoride (Dunlop) method, which has been referred to above and is well-known to those skilled in the art.

The invention has been described in detail with particular reference to preferred embodiments thereof, but it will be understood that variations and modifications can be effected which will be within the spirit and scope of the disclosure.

I claim:

1. A method of manufacturing a latex product without vulcanization, comprising:
    adding from about 0.5% to about 2.0% of a setting agent and from about 0.5% to about 2.0% of an anti-foaming agent to a latex compound to form a latex mixture;
    injecting said mixture into a mold;
    subjecting said mixture to one of cooling and heating, and thereby causing said mixture to be formed while said mixture is in said mold;
    removing a molded article from said mold;
    drying said article; and
    washing said article.

2. The method according to claim 1 wherein said latex compound comprises about 98% to about 99.5% of 60% natural rubber latex.

3. The method according to claim 1 wherein said setting agent is sodium silicone fluoride.

4. The method according to claim 1 wherein said anti-foaming agent comprises silicone and emulsifier.

5. A method of manufacturing a latex product without vulcanization, comprising:
    adding from about 0.5% to about 2.0% of a setting agent, about 0.5% to about 1.0% of a water based dispersion pigment, and about 0.5% to about 2.0% of a combination of silicone and emulsifier to a latex compound to form a latex mixture;
    injecting said mixture into a mold;
    heating said mixture for a period of about 10 minutes to about 30 minutes at a temperature ranging from about 70° C. to about 100° C. and thereby causing said mixture to be formed while said mixture is in said mold;
    removing a molded article from said mold;
    drying said article for a period of about 48 hours to about 60 hours at a temperature ranging from about 60° C. to about 75° C.;
    washing said article in an aqueous wash; and
    drying said article for a period of about 1 hour to about 3 hours at a temperature ranging from about 55° C. to about 75° C.

6. The method according to claim 5 wherein said latex compound comprises about 98% to about 99.5% of 60% natural rubber latex.

7. The method according to claim 5 wherein said setting agent is sodium silicone fluoride.

8. A method of manufacturing a latex product without vulcanization, comprising:
    adding from about 0.5% to about 2.0% of a setting agent, about 0.5% to about 1.0% of a water based dispersion pigment, and about 0.5% to about 2.0% of a combination of silicone and emulsifier to a latex to form a latex mixture;
    injecting said mixture into a mold;
    cooling said mixture for a period of about 10 minutes to about 45 minutes at a temperature ranging from about 15° C. to about 22° C. and thereby causing said mixture to be formed while said mixture is in said mold;
    removing a molded article from said mold;
    drying said article for a period of about 48 hours to about 60 hours at a temperature ranging from about 15° C. to about 22° C.

9. The method according to claim 8 wherein said latex compound comprises about 98 % to about 99.5 % of 60% natural rubber latex.

10. The method according to claim 8 wherein said setting agent is sodium silicone fluoride.

11. A method of manufacturing a latex product without vulcanization, comprising:
    adding from about 0.5% to about 2.0% of a setting agent, about 0.5% to about 1.0% of a water based dispersion pigment, and about 0.5% to about 2.0% of a combination of silicone and emulsifier to a latex to form a latex mixture;
    injecting said mixture into a mold;
    heating said mixture for a period of about 10 minutes to about 30 minutes at a temperature ranging from about 70° C. to about 100° C. and thereby causing said mixture to be formed while said mixture is in said mold;
    removing a molded article from said mold;
    drying said article for a period of about 48 hours to about 60 hours at a temperature ranging from about 15° C. to about 22° C.;

washing said article in an aqueous wash; and drying said article for about 1 hour to about 3 hours at a temperature ranging from about 55° C. to about 75° C.

12. The method according to claim 11 wherein said latex compound comprises about 98% to about 99.5% of 60% natural rubber latex.

13. The method according to claim 11 wherein said setting agent is sodium silicone fluoride.

14. The method according to claim 1 wherein:

said step of subjecting includes one of exposing said mixture to dry air at a temperature ranging from about 15° C. to about 22° C. and exposing said mixture to an elevated temperature in the range of about 70° C. to about 100° C.; and said step of drying includes one of exposing said molded article to dry air at a temperature ranging from about 15° C. to about 22° C. and exposing said molded article to an elevated temperature ranging from of about 55° C. to about 75° C.

15. The method according to claim 1 wherein said step of subjecting includes heating said mixture in a steamer.

* * * * *